US011433572B2

(12) United States Patent
Herrera Garcia et al.

(10) Patent No.: US 11,433,572 B2
(45) Date of Patent: Sep. 6, 2022

(54) METHOD FOR PREPARING A MOLDED POLYMERIC ARTICLE

(71) Applicant: PPG Industries Ohio, Inc., Cleveland, OH (US)

(72) Inventors: Marco Antonio Herrera Garcia, Pittsburgh, PA (US); George A. Galo, Jr., Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/270,629

(22) PCT Filed: Aug. 23, 2019

(86) PCT No.: PCT/US2019/047806
§ 371 (c)(1),
(2) Date: Feb. 23, 2021

(87) PCT Pub. No.: WO2020/041648
PCT Pub. Date: Feb. 27, 2020

(65) Prior Publication Data
US 2021/0331354 A1 Oct. 28, 2021

Related U.S. Application Data

(60) Provisional application No. 62/722,605, filed on Aug. 24, 2018, provisional application No. 62/808,966, filed on Feb. 22, 2019.

(51) Int. Cl.
*B29C 35/02* (2006.01)
*B29D 11/00* (2006.01)
(Continued)

(52) U.S. Cl.
CPC ............. *B29C 35/02* (2013.01); *B29C 39/02* (2013.01); *B29C 39/26* (2013.01); *B29C 39/38* (2013.01);
(Continued)

(58) Field of Classification Search
CPC ......... B29C 35/02; B29C 39/38; B29C 39/02; B29C 39/26; B29D 11/00442
See application file for complete search history.

(56) References Cited

U.S. PATENT DOCUMENTS 5,028,358 A * 7/1991 Blum ............... B29D 11/00538
264/1.32
5,319,007 A 6/1994 Bright
(Continued)

FOREIGN PATENT DOCUMENTS

JP S63312132 A 12/1988
WO 2018078291 A1 5/2018

*Primary Examiner* — Mathieu D Vargot
(74) *Attorney, Agent, or Firm* — Krisanne Shideler

(57) ABSTRACT

Provided is a method for preparing a polymeric article including introducing a polymerizable composition into a mold; sealing the composition within the mold using a sealing means; placing the mold into a convection cure oven; subjecting the polymerizable composition to a cure cycle sufficient to partially cure the composition; extracting the mold from the convection cure oven; optionally, removing the sealing means from the mold; placing the mold into an auxiliary curing chamber which is placed into the convection cure oven, or placing the mold into an auxiliary curing chamber which is within the convection cure oven; subjecting the polymerizable composition to a further cure cycle to complete polymerization of the composition, thereby forming a cured polymeric article; and removing the cured polymeric article from the mold.

17 Claims, 4 Drawing Sheets

(51) Int. Cl.
  *B29C 39/02*    (2006.01)
  *B29C 39/26*    (2006.01)
  *B29C 39/38*    (2006.01)
  B29K 69/00     (2006.01)
  B29K 105/00    (2006.01)
  B29L 11/00     (2006.01)

(52) U.S. Cl.
  CPC .... *B29D 11/00442* (2013.01); *B29K 2069/00* (2013.01); *B29K 2105/0002* (2013.01); *B29K 2105/0005* (2013.01); *B29K 2909/08* (2013.01); *B29L 2011/0016* (2013.01)

(56)         References Cited

U.S. PATENT DOCUMENTS

| | | |
|---|---|---|
| 2003/0203065 A1 | 10/2003 | Buazza et al. |
| 2008/0160283 A1 | 7/2008  | Wiand |
| 2017/0066876 A1 | 3/2017  | Herold et al. |
| 2018/0051115 A1 | 2/2018  | Herold |
| 2020/0062924 A1 | 2/2020  | Lafarge et al. |

\* cited by examiner

METHOD FOR PREPARING A MOLDED POLYMERIC ARTICLE

CROSS REFERENCE TO RELATED APPLICATIONS

This application is the United States national phase of International Application No. PCT/US2019/047806 filed Aug. 23, 2019, and claims the benefit of priority from U.S. Provisional Application No. 62/722,605, filed Aug. 24, 2018, and from U.S. Provisional Application No. 62/808,966, filed Feb. 22, 2019, the disclosures of which are herby incorporated by reference in their entirety.

FIELD OF THE INVENTION

The present invention relates to a method for preparing a molded polymeric article, such as a molded optical article, which requires higher cure temperatures.

BACKGROUND OF THE INVENTION

Allyl carbonate monomer compositions can be polymerized to use as transparent coatings, optical lenses and other optical articles, as well as other molded articles. Polymerization of such allyl carbonate monomer compositions is conventionally accomplished by the inclusion in the composition of one or more free-radical initiators, such as organic peroxy initiators. One of the most commonly used organic peroxy free-radical initiators is isopropyl peroxy dicarbonate ("IPP"). However, IPP decomposes at ambient temperature and, thus, requires special shipping and handling measures. More stable free-radical initiators are available, but these initiators generally require higher cure temperatures. For some free-radically polymerizable compositions, these higher cure temperatures can result in severe defects in the final cured product. For example, in the case of molded optical articles, such high cure temperatures can result in surface and/or edge cracking of the cured molded articles.

Therefore, it would be desirable to provide a method for preparing a molded polymeric article utilizing a free-radically polymerizable composition comprising a more stable free-radical initiator which can reduce defects and avoid other problems encountered when using higher cure temperatures.

SUMMARY OF THE INVENTION

The present invention is directed to a method for preparing a molded polymeric article, the method comprising:
(a) providing a free-radically polymerizable composition;
(b) introducing the polymerizable composition into a mold cavity of a mold, such as a mold having a front portion and a back portion spaced one from the other, thereby defining a mold cavity there between;
(c) sealing the polymerizable composition within the mold cavity using a sealing means;
(d) placing the mold of (c) into a cure oven, such as a convection cure oven;
(e) subjecting the polymerizable composition within the mold cavity to a cure cycle sufficient to at least partially cure the polymerizable composition, thereby forming an at least partially cured polymeric article within the mold cavity;
(f) extracting the mold from the cure oven;
(g) optionally, removing the sealing means from the mold;
(h) placing the mold of (g) into an auxiliary curing chamber which is then placed into the cure oven, or placing the mold of (g) into an auxiliary curing chamber which is disposed within the cure oven;
(i) subjecting the at least partially cured polymerizable composition within the mold cavity to a further cure cycle sufficient to complete polymerization of the polymerizable composition, thereby forming a cured polymeric article within the mold cavity; and
(j) removing the cured polymeric article from the mold.

DETAILED DESCRIPTION OF THE INVENTION

Figure 1:
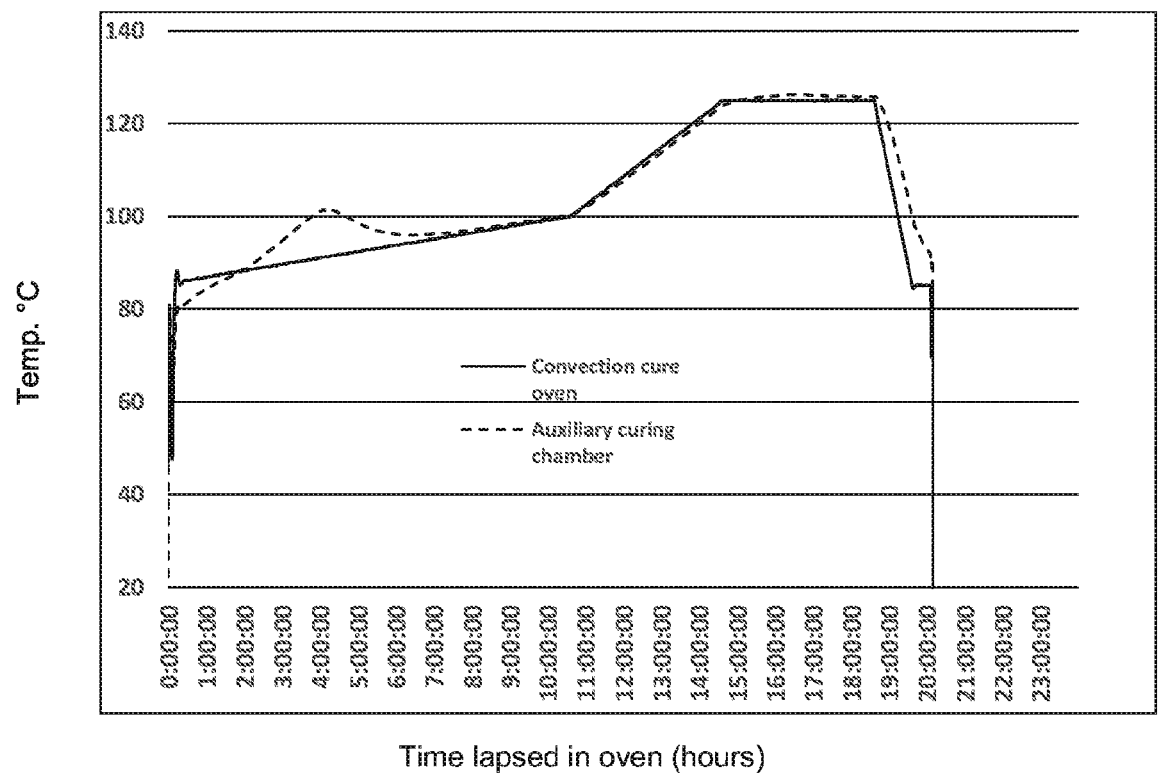
FIG. 1 depicts a graphic illustration of the temperature profile of the curing environment within the auxiliary curing chamber during the cure cycle.

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

As used in this specification and the appended claims, the phrase "and/or" when used in a list is meant to encompass alternative embodiments including each individual component in the list as well as any combination of components. For example, the list "A, B, and/or C" is intended to encompass seven separate embodiments that include A, or B, or C, or A+B, or A+C, or B+C, or A+B+C.

The various aspects and examples of the present invention as presented herein are each understood to be non-limiting with respect to the scope of the invention.

As mentioned previously, the present invention is directed to a method for preparing a molded polymeric article. The method comprises:

(a) providing a free-radically polymerizable composition;

(b) introducing the polymerizable composition into a mold cavity of a mold, such as a mold having a front portion and a back portion spaced one from the other, thereby defining a mold cavity there between;

(c) sealing the polymerizable composition within the mold cavity using a sealing means;

(d) placing the mold of (c) into a cure oven, such as a convection cure oven;

(e) subjecting the polymerizable composition within the mold cavity to a cure cycle sufficient to at least partially cure the polymerizable composition, thereby forming an at least partially cured polymeric article within the mold cavity;

(f) extracting the mold from the cure oven;

(g) optionally, removing the sealing means from the mold;

(h) placing the mold of (g) into an auxiliary curing chamber which is then placed into the cure oven, or placing the mold of (g) into an auxiliary curing chamber which is disposed within the cure oven;

(i) subjecting the at least partially cured polymerizable composition within the mold cavity to a further cure cycle sufficient to complete polymerization of the polymerizable composition, thereby forming a cured polymeric article within the mold cavity; and (j) removing the cured polymeric article from the mold.

Suitable polymerizable compositions for use with the method can be any of the art-recognized, free-radically polymerizable compositions useful in the manufacture of molded articles. For example, the free-radically polymerizable compositions can include, but are not limited to, those comprising at least one free-radically polymerizable monomer. Exemplary non-limiting free-radically polymerizable monomers can include polyol(allyl carbonate) monomers, e.g., allyl diglycol carbonate monomers, such as diethylene glycol bis(allyl carbonate) monomers, which is sold under the tradename CR-39 by PPG Industries, Inc., including all of the variations thereof; polyol(meth)acryloyl terminated carbonate monomers; diethylene glycol dimethacrylate monomers; ethoxylated phenol methacrylate monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate) monomers, or mixtures of any of the foregoing. Further, suitable polymerization compositions can include those described in detail in U.S. Publication No. 2017/0066876 A1, at paragraphs [0016]-[0050], the recited portions of which are incorporated by reference herein.

Additionally, any of the free-radically polymerizable compositions described herein can comprise isohexide bis(allyl carbonate) monomers. For example, the free-radically polymerizable composition can comprise at least one isohexide bis(allyl carbonate) monomer selected from the group consisting of isosorbide bis(allyl carbonate), isoidide bis(allyl carbonate), isomannide bis(allyl carbonate), and mixtures thereof. The preparation of such isohexide bis(allyl carbonate) monomers is described in detail in U.S. Publication No. 2018/0051115 A1 at paragraphs [0017]-[0034], the recited portions of which are incorporated by reference herein.

Also, any of the free-radically polymerizable compositions described herein can comprise a free-radically polymerizable monomer selected from the group consisting of ethyleneglycol bis(allyl carbonate), diethyleneglycol bis(allyl carbonate), triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof. Other suitable monomers can include, for example, the reaction product of at least one of a bischloroformate or trischloroformate, allyl alcohol, and at least one polyol. The preparation of such monomers is described in detail in U.S. Publication No. 2018/0051115 A1 at paragraphs [0035]-[0037], the recited portions of which are incorporated by reference herein. Also suitable are monomers which comprise the transesterification reaction product of diallyl carbonate and at least one polyol. The preparation of such monomers is described in detail in U.S. Publication No. 2018/0051115 A1 at paragraph [0038], incorporated by reference herein.

The method of the present invention is useful for preparing molded polymeric articles using any of the aforementioned polymerizable compositions, particularly those comprising allyl diglycol carbonate monomers, and poly(allyl carbonate) monomers, such as diethylene glycol bis(allyl carbonate) monomers.

In addition to the free-radically polymerizable monomer(s), the polymerizable composition comprises an initiating amount of material capable of generating free radicals, i.e., a free-radical initiator, such as organic peroxy compounds. The polymerization composition employed in the method of the present invention comprises at least one polymerization initiator having a 10-hour half-life at a temperature of 70° C. or higher, such as a 10-hour half-life at a temperature of 80° C. or higher.

Examples of suitable polymerization initiators can include, but are not limited to, those selected from the group consisting of tert-amylperoxy 2-ethylhexyl carbonate, tert-butylperoxy isopropyl carbonate, tert-butylperoxy 2-ethylhexyl carbonate, polyether poly-tert-butylperoxycarbonate, tert-butyl peroxy-2-ethylhexanoate, tert-butyl peroxyisobutyrate, tert-amyl peroxyacetate, tert-amyl peroxybenzoate, tert-butyl peroxyacetate, butyl 4,4-di(tert-butylperoxy) valerate, tert-butyl peroxybenzoate, tert-butyl peroxy-3,5,5-trimethylhexanoate, benzoyl peroxide, 1,1-di(tert-butylperoxy)-3,3,5-trimethylcyclohexane, 1,1-di(tert-amylperoxy) cyclohexane, 1,1-di(tert-butylperoxy)cyclohexane, 2,2-di(tert-butylperoxy)butane, dicumyl peroxide, 1-t-amylperoxy-1-methoxycyclohexane, di-tert-butyl peroxide, 1,1-dimethyl propyl 1-methoxycycohexylperoxide, and mixtures thereof.

The amount of free-radical initiator used to initiate and polymerize the polymerizable composition may vary and will depend on the particular initiator used, so long as the type and amount is sufficient to initiate and sustain the polymerization of the monomers present in the composition.

Various conventional additives may be included in the polymerizable composition, such as light stabilizers, heat stabilizers, ultraviolet light absorbers, mold release agents, dyes, pigments, flexibilizing additives which are not radically polymerizable, e.g., alkoxylated phenol benzoates and poly(alkylene glycol) dibenzoates, antioxidants, e.g., hindered phenol antioxidants, and polymerization inhibitors or shelf-life stabilizers.

In the method of the present invention, the polymerizable composition is introduced into a mold cavity of a mold, for example, a glass mold. The mold can have a front portion and a back portion which are spaced one from the other, thereby defining a mold cavity there between. Each of the front portion and the back portion of the mold has an exterior surface and an interior surface. The interior surface of the front portion and the interior surface of the back portion each has a curvature of 0.0 to 10.0 diopters.

The polymerizable composition is introduced into the mold cavity. The polymerizable composition then is sealed within the mold cavity using a sealing means. The sealing means can be comprised of any suitable material capable of holding together the front and back portions of the mold. The sealing means should comprise materials compatible with the polymerizable compositions components (i.e., the polymerizable monomers and the free-radical initiator) and should be able to withstand processing temperatures as high as 130° C. Suitable sealing means can include, for example, a gasket, such as a rubber gasket, and/or adhesive tape as are well known in the art. Alternatively, the sealing means can include one or more clamps for securing the front and back portions of the filled mold. Also, it should be understood that multiple sealing means can be used in combination to seal the polymerizable composition within the mold cavity.

The sealed mold containing the polymerizable composition then is placed into a cure oven, such as a convection cure oven, and the polymerizable composition within the mold cavity is subjected to a cure cycle sufficient to at least partially cure the polymerizable composition, thereby forming an at least partially cured polymeric article within the mold cavity. Alternatively, the sealed mold containing the polymerizable composition first can be placed into an auxiliary curing chamber which then is placed into the cure oven and the polymerizable composition within the mold cavity is subjected to a cure cycle sufficient to at least partially cure the polymerizable composition thereby forming an at least partially cured polymeric article within the mold cavity. As used herein, the phrase "at least partially cure" and like terms means that the polymerizable composition is subjected to conditions sufficient to polymerize the composition components slightly beyond the point at which the composition loses fluidity due to gelation (i.e., slightly beyond the gel point). For example, in the embodiment where the polymerizable composition comprises allylic monomers, this point slightly beyond the gel point can be characterized as the point at which 2% to 50% allyl functional group conversion is achieved, such as 2% to 40%, or 2% to 30%, such as 10% to 30%, or 15% to 25%, or 2% to 20%, or 2% to 15%, or 2% to 10%, or 2% to 8%, or 2% to 6% allyl functional group conversion is achieved.

The mold including the at least partially cured polymeric article then is extracted from the cure oven, and the sealing means may or may not be removed from the mold. Generally, the sealing means is removed from the mold at this point in the process. The mold can then be placed into an auxiliary curing chamber (outside of the convection cure oven) and the auxiliary curing chamber containing the mold then can be placed into the cure oven; or the mold can be placed into an auxiliary curing chamber which is already disposed within the cure oven. After the mold is placed into the auxiliary curing chamber, the auxiliary curing chamber is closed. By "closed" is meant that the mold is enclosed within the auxiliary curing chamber. For example, the mold can be surrounded on all sides by the auxiliary curing chamber.

The mold (within the closed auxiliary curing chamber) which contains the at least partially cured polymerizable composition within the mold cavity then is subjected to a further cure cycle sufficient to complete polymerization of the polymerizable composition, thereby forming a cured polymeric article within the mold cavity. As used herein in the specification and the claims, by "complete polymerization" or "complete cure" is meant that the at least partially cured polymerizable composition is subjected to conditions that result in greater than 50% allylic group conversion (of allylic components of the composition), such as greater than 60% allylic group conversion, such as greater than 70% allylic group conversion, such as greater than 80% allylic group conversion, such as greater than 90% allylic group conversion. Also complete polymerization or complete cure can be characterized as greater than 50% up to and including 100% allylic group conversion, such as greater than 50% up to and including 95% allylic group conversion, such as greater than 50% up to and including 90% allylic group conversion, such as greater than 50% up to and including 85% allylic group conversion, such as greater than 50% up to and including 80% allylic group conversion, such as greater than 50% up to and including 75% allylic group conversion, or greater than 50% up to and including 70% allylic group conversion. The cured polymeric article then is removed from the mold.

Depending upon the construction of the auxiliary curing chamber, the cured polymeric article can be extracted/removed from the mold while the auxiliary curing chamber remains in the cure oven, and the cured polymeric article then can be removed from the mold. Alternatively, the auxiliary curing chamber can be extracted/removed from the cure oven, the mold can be extracted/removed from the auxiliary curing chamber, and the cured polymeric article then can be removed from the mold.

One skilled in the art would understand that the cure temperature and cure time ("cure cycle") used to achieve at least partial cure of the polymerizable composition within the mold cavity, and complete cure of the polymerizable composition within the mold cavity, are dependent upon the polymerizable monomer(s) and polymerization initiator(s) which comprise the polymerizable composition.

The auxiliary curing chamber generally can be rigid or non-rigid and can be comprised of any of a number of art-recognized heat conductive materials. For example, such heat conductive materials can include, but are not limited to, those selected from the group consisting of metal sheet, metal foil, composite fabric, and combinations of the foregoing. Suitable composite fabrics can include any composite fabric which can meet conditions required by the methods of the present invention, for example, temperatures of at least 130° C., chemical resistance to organic solvents, and fabric flexibility and impermeability properties. Non-limiting examples of suitable composite fabrics can include, but are not limited to, silicone-coated fiberglass fabric and/or aluminized fiberglass fabric.

The auxiliary curing chamber can be constructed in any configuration provided the filled molds can be enclosed therein. For example, it can be in the form of a box with a bottom, four sides, and a top or lid. Alternatively, the auxiliary curing chamber can be comprised of one or more trays of filled molds draped with composite fabric. If multiple trays of filled molds are used, the trays can be stacked with space between the layers and the entire "stack" draped with composite fabric. While it is not necessary that the auxiliary curing chamber be absolutely sealed, e.g., air tight, the interior of the auxiliary curing chamber preferably is fully enclosed. The auxiliary curing chamber is removable from the cure oven interior such that the filled mold(s) can be placed in and removed from the cure oven while remaining enclosed within the auxiliary curing chamber. Also, it should be understood that multiple auxiliary curing chambers can be placed simultaneously within the cure oven during the cure cycle.

Surprisingly, it has been found that employing the auxiliary curing chamber within the cure oven, such as a convection cure oven, during the cure cycle as described above results in higher yield of commercially acceptable molded articles. Without being bound by theory, it is believed that enclosure of the filled molds within the auxiliary curing chamber localizes the heat generated by the exothermic polymerization reaction of the polymerizable composition components within the mold. This prevents the rapid removal/dissipation of the heat of exotherm which can occur with the circulation of the air flow within the convection cure oven environment. After a period of time, the temperature within the auxiliary cure chamber equilibrates to the temperature of the convection cure oven environment. The foregoing is illustrated by FIG. 1 which shows the temperature profile of the curing environment within the auxiliary curing chamber during the period of exotherm, which differs from that of the environment within the cure oven during the same time period.

Figure 2:
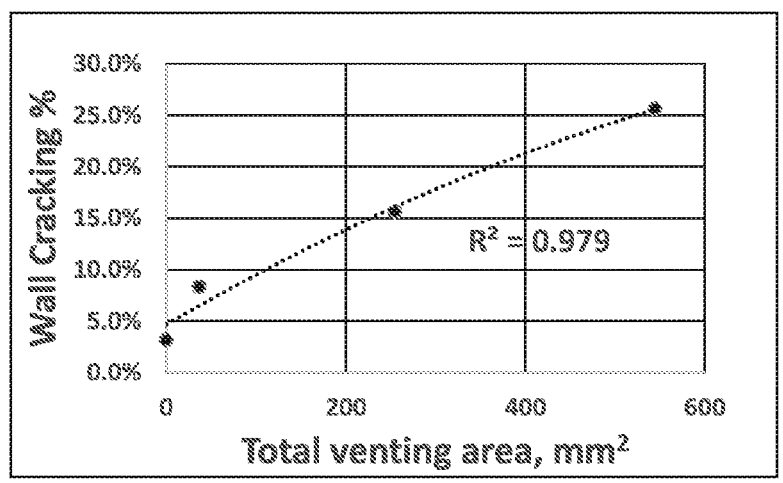
FIG. 2 depicts a graphic illustration of the percent of fracture failures versus total venting area in the curing chamber during the cure cycle.

Further, it has been noted that the enclosure of the filled molds within the auxiliary curing chamber retains the volatiles released by the polymerizable composition during polymerization of the composition components. A strong correlation exists between the amount of chamber ventilation and the proportion of molded articles exhibiting defects, such as wall or edge cracking. This correlation is illustrated by the data graphically presented in FIG. 2. The method of the present invention results in a higher yield of cured polymeric articles, particularly cured optical lenses, which are free of surface cracking and/or edge cracking defects, or which have a reduced amount of such defects.

As previously mentioned, the method of the present invention is particularly suitable for preparing molded optical articles, such as optical elements, for example optical lenses including piano and ophthalmic lenses, shields and visors, windows, mirrors, active or passive liquid crystal cell elements or devices, and display elements such as screens, including touch screens on devices, for example, cell phones, tablets, GPS, voting machines, point-of-sale devices or computer screens, display sheets in a picture frame, monitors, wearable displays, or security elements. Such articles may or may not include optical articles exhibiting one or more light-influencing properties, such as tint, photochromic, and/or polarization properties.

Figure 4:
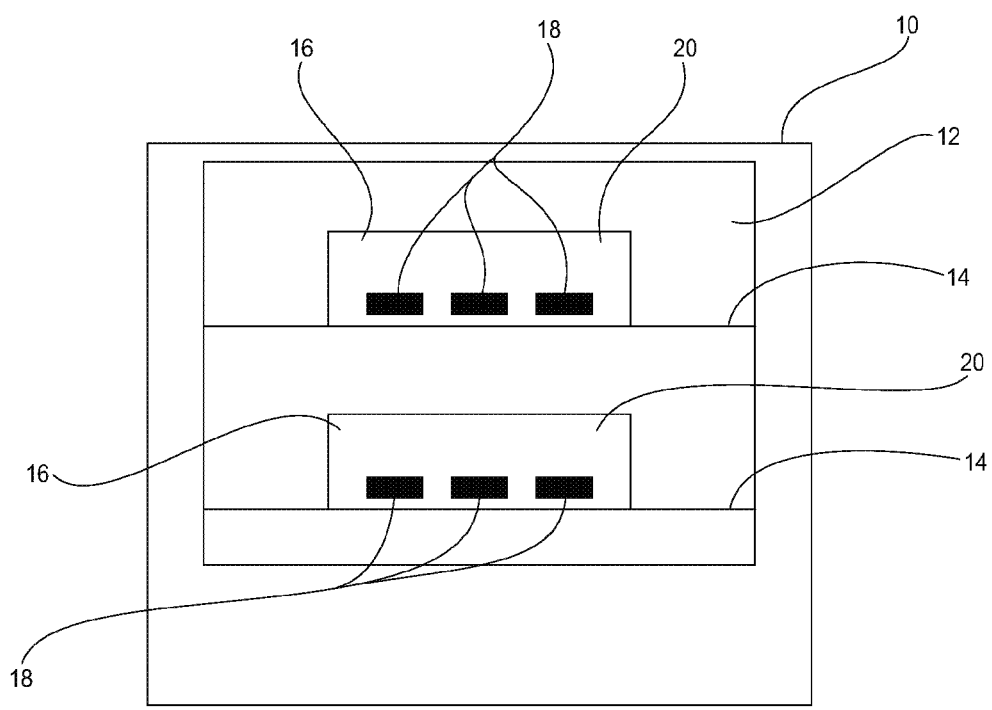
FIG. 4 is a side, schematic view of a cure oven containing examples of auxiliary curing chambers.

FIG. 4 illustrates a cure oven 10 in the form of a convection cure oven having an interior 12 and a pair of shelves 14. A pair of auxiliary curing chambers 16 are located on the shelves 14. Molds 18 are located in the interior 20 of the auxiliary curing chambers 16.

The present invention is more particularly described in the following examples, which are intended as illustrative only since numerous modifications and variations therein will be apparent to those skilled in the art.

EXAMPLES

Part 1. Auxiliary Curing Chamber Construction

Auxiliary curing chambers used in the examples were prepared as described below.

Example 1

An auxiliary curing chamber configured as a box-like enclosure was prepared. The box-like enclosure had dimensions of 292 mm width×330 mm depth×102 mm height. The bottom and two opposite sides were constructed of 1.9 mm thick galvanized steel. The front, top and back were covered with 0.24 mm thick aluminum foil wrapped around each abutting edge. The auxiliary curing chamber thus prepared had an approximate volume of 10 Liters.

Example 2

An auxiliary curing chamber configured as a box-like enclosure was prepared. The box-like enclosure had dimensions of 451 mm width×381 mm depth×152 mm height. The bottom, sides, front and back were constructed from 1.8 mm thick aluminum. The top was covered with 0.24 mm thick aluminum foil wrapped around each abutting edge. The auxiliary curing chamber thus prepared had an approximate volume of 26 Liters.

Example 3

An auxiliary curing chamber configured as a box-like enclosure was prepared. The box-like enclosure had dimensions of 451 mm width×381 mm depth×152 mm height. The bottom was constructed from 1.8 mm thick aluminum. The sides, front, back and top were constructed from 0.6 mm thick, 17 ounce silicone-coated fiberglass fabric purchased from TARPSNOW®. The auxiliary curing chamber thus prepared had an approximate volume of 26 Liters.

Example 4

An auxiliary curing chamber configured as a box-like enclosure was prepared. The box-like enclosure had dimensions of 571 mm width×495 mm depth×419 mm height. The sides, front, back and top were constructed of 0.6 mm thick, 17 ounce silicone coated fiberglass fabric. The bottom was constructed from 1.8 mm thick aluminum. The auxiliary curing chamber thus prepared had an approximate volume of 119 liters.

Part 2. Polymerizable Compositions Used in the Examples

TABLE 1

| Composition | CR-39® HV Monomer[1] | CR-39® Monomer High ADC[2] | LUPEROX® V10[3] | TECH-LUBE™ 113[4] | UV absorber[5] |
|---|---|---|---|---|---|
| A | 98.29 | — | 1.45 | 0.0004 | 0.26 |
| B | — | 97.84 | 1.90 | 0.001 | 0.26 |
| C | 98.19 | — | 1.55 | 0.0004 | 0.26 |

[1]A mixture of allyl diglycol carbonate monomer, commercially available from PPG Industries.
[2]A mixture of allyl diglycol carbonate monomer, commercially available from PPG Industries.
[3]1,1-dimethyl propyl 1-methoxycyclohexylperoxide, commercially available from Arkema.
[4]A molding release product commercially available from Technick Products.
[5]A benzophenone type UV absorber.

Figure 3:
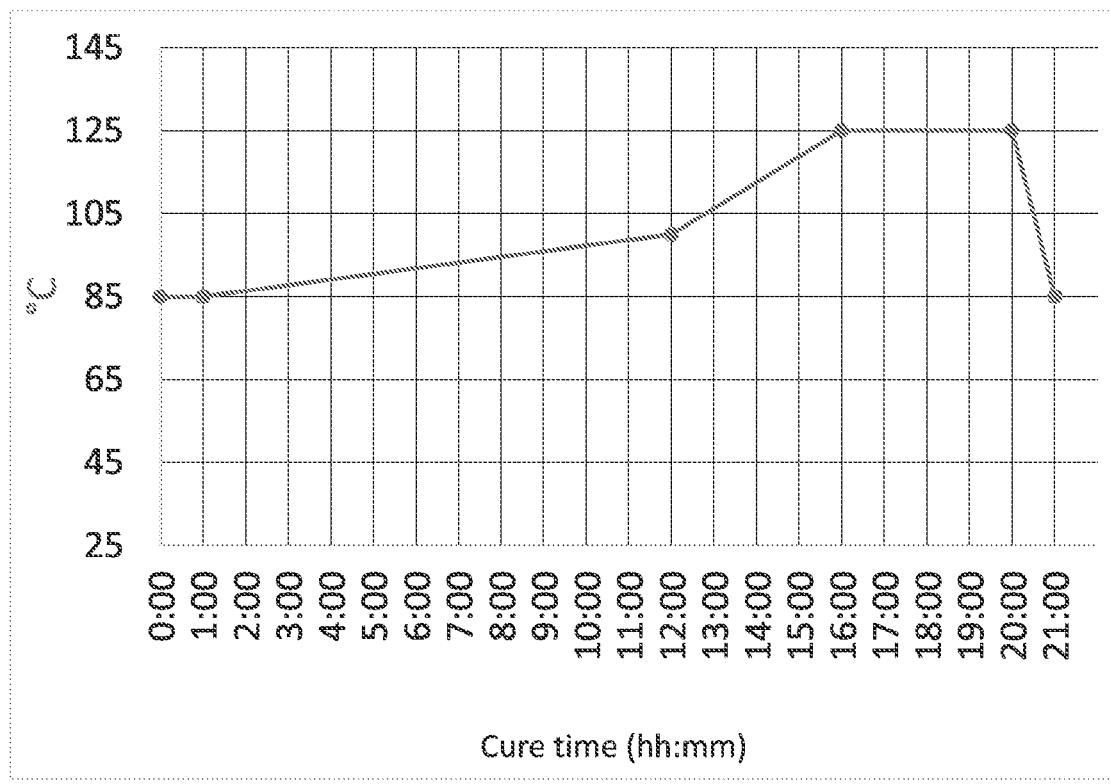
FIG. 3 depicts a graphic illustration of the curing oven time/temperature profile which was used to prepare lenses of the Examples.

Part 3. Preparation of Molded Optical Articles
General procedure for preparing molded lenses:

Mold cavities were assembled with 83 mm diameter glass molds and using tape as sealing means; the molds curvature configuration resulted in a finished single vision ("FSV") lens with 2 mm center thickness and an optical power as described in Table 3 below. The polymerizable composition was prepared by combining the monomer and peroxide, and remaining ingredients, then stirred, and degassed under vacuum. The polymerizable composition thus prepared was introduced into the molds, and the molds were sealed with a poly(dimethylsiloxane) adhesive tape on a three-layered backing comprising polyethylene terephthalate (PET, 13 µm); isophthalate polyester polyurethane (3.5 µm); PET (26 µm). For each polymerizable composition, the indicated number of cast molds were placed into a mechanical convection oven with a programmable controller and chamber volume of 137 Liters. Each batch of casted molds were subjected to the oven temperature profile ("cure schedule") described below in Table 2 below and depicted in FIG. 3 which graphically represents the cure cycle. At the specified lapsed time, as indicated in Table 3, the cure schedule program was paused. The casted molds were extracted from the oven; then the tape was removed from every mold assembly.

TABLE 2

Oven temperature profile during cure.

| Step | Process/ Temperature | Duration (hh:mm) | Accumulated Time (hh:mm) |
|---|---|---|---|
| 1 | Ramp/85° C. | 00:05 | 00:05 |
| 2 | Hold/85° C. | 01:00 | 01:05 |
| 3 | Ramp/100° C. | 11:00 | 12:05 |
| 4 | Ramp/125° C. | 04:00 | 16:05 |
| 5 | Hold/125° C. | 04:00 | 20:05 |
| 6 | Ramp/85° C. | 01:00 | 21:05 |

In the comparative examples CE-5 and CE-6, the mold assemblies were placed directly back into the convection oven (i.e., no auxiliary curing chamber was used) and the cure schedule program was resumed. For Examples 7 through 12, which represent the method of the present invention, the assemblies were first placed into the auxiliary curing chamber as indicated in the following Table 3, then the entire auxiliary curing chamber was placed back into the convection oven, and the cure schedule program was resumed.

Once the cure schedule was complete, the respective mold assemblies were extracted from the oven/auxiliary curing chamber, and the cured lenses were removed from the molds. The demolded lenses were evaluated for visible fractures or cracks. A lens that was free of fractures or cracks, or in which peripheral fractures or cracks were limited to an area less than 2 mm from the edge, was considered acceptable. Any lenses that spontaneously demolded during the cure cycle were not considered acceptable. Those lenses considered acceptable were then further evaluated for the presence or absence of cracks on the "wall" (reported as "wall cracking"). The number of acceptable lenses that also were free of wall cracking were also recorded. The reported "% Yield Total" were calculated by dividing the number of "acceptable" lenses by the total number of molds cast. The reported "% Free of Wall Cracking" were determined by dividing the number of acceptable lenses free of wall cracking by the total number of acceptable lenses. The number of molds cast for each Example, the final yield (% Yield Total) and "% Free of Wall Cracking" are reported in Table 3 below.

TABLE 3

| Example | Polymerizable Composition | Mold configuration | Time at pause (min) | Auxiliary Curing Chamber | Molds cast (#) | % Yield Total | % Free of Wall Cracking |
|---|---|---|---|---|---|---|---|
| CE-5 | A | FSV −2.00 | 80 | none | 8 | 88 | 0 |
| CE-6 | B | FSV −4.00 | 140 | none | 11 | 36 | 0 |
| 7 | A | FSV −2.00 | 80 | Example 1 | 8 | 88 | 100 |
| 8 | A | FSV −4.00 | 80 | Example 2 | 16 | 88 | 100 |
| 9 | A | FSV −6.00 | 80 | Example 2 | 16 | 81 | 100 |
| 10 | A | FSV −4.00 | 80 | Example 3 | 18 | 83 | 100 |
| 11 | B | FSV −4.00 | 140 | Example 2 | 12 | 83 | 90 |
| 12 | C | FSV −2.00 | 80 | Example 4 | 80 | 78 | 70 |

The data presented above in Table 3 illustrate the significant improvements in yield as well as a reduction in wall cracking defects provided by using the method of the present invention to prepare molded polymeric articles such as lenses.

The present invention can be further characterized by one or more of the following non-limiting clauses:

Clause 1. A method for preparing a molded polymeric article, the method comprising:

(a) providing a free-radically polymerizable composition;

(b) introducing the polymerizable composition into a mold cavity of a mold, such as a mold having a front portion and a back portion spaced one from the other, thereby defining a mold cavity there between;

(c) sealing the polymerizable composition within the mold cavity using a sealing means;

(d) placing the mold of (c) into a cure oven, such as a convection cure oven;

(e) subjecting the polymerizable composition within the mold cavity to a cure cycle sufficient to at least partially cure the polymerizable composition, thereby forming an at least partially cured polymeric article within the mold cavity;

(f) extracting the mold from the cure oven;

(g) optionally, removing the sealing means from the mold;

(h) placing the mold of (g) into an auxiliary curing chamber which is then placed into the cure oven, or placing the mold of (g) into an auxiliary curing chamber which already is positioned or disposed within the cure oven;

(i) subjecting the at least partially cured polymerizable composition within the mold cavity to a further cure cycle sufficient to complete polymerization of the polymerizable composition, thereby forming a cured polymeric article within the mold cavity; and (j) removing the cured polymeric article from the mold.

Clause 2. The method of clause 1, wherein in (g) the sealing means is removed from the mold.

Clause 3. The method of clause 1 or 2, wherein, prior to (d), the mold of (c) is placed within an auxiliary curing chamber which is then placed within the cure oven.

Clause 4. The method of any of clauses 1 to 3, further comprising extracting the mold of (i) from the auxiliary curing chamber prior to (j).

Clause 5. The method of any of clauses 1 to 4, wherein the polymerizable composition comprises at least one free-radically polymerizable monomer.

Clause 6. The method of any of clauses 1 to 5, wherein the polymerizable composition comprises at least one polymerization initiator having a half-life of 10 hours at a temperature of 70° C. or higher.

Clause 7. The method of any of clauses 1 to 6, wherein the polymerizable composition comprises at least one polyol (allyl carbonate) monomer and/or at least one isohexide bis(allyl carbonate) monomer.

Clause 8. The method of any of clauses 1 to 7, wherein the polymerizable composition comprises diethylene glycol bis (allyl carbonate) monomer.

Clause 9. The method of any of clauses 1 to 8, wherein the polymerization initiator is selected from the group consisting of tert-amylperoxy 2-ethylhexyl carbonate, tert-butylperoxy isopropyl carbonate, tert-butylperoxy 2-ethylhexyl carbonate, polyether poly-tert-butylperoxycarbonate, tert-butyl peroxy-2-ethylhexanoate, tert-butyl peroxyisobutyrate, tert-amyl peroxyacetate, tert-amyl peroxybenzoate, tert-butyl peroxyacetate, butyl 4,4-di(tert-butylperoxy) valerate, tert-butyl peroxybenzoate, tert-butyl peroxy-3,5,5-trimethylhexanoate, benzoyl peroxide, 1,1-di(tert-butylperoxy)-3,3,5-trimethylcyclohexane, 1,1-di(tert-amylperoxy) cyclohexane, 1,1-di(tert-butylperoxy)cyclohexane, 2,2-di (tert-butylperoxy)butane, dicumyl peroxide, 1-t-amylperoxy-1-methoxycyclohexane, di-tert-butyl peroxide, 1,1-dimethyl propyl 1-methoxycyclohexylperoxide, and mixtures thereof.

Clause 10. The method of any of clauses 1 to 9, wherein the auxiliary curing chamber is comprised of heat conductive material selected from the group consisting of metal sheet, metal foil, composite fabric, and combinations of the foregoing.

Clause 11. The method of any of clauses 1 to 10, wherein the auxiliary curing chamber is comprised of composite fabric comprising at least one of silicone-coated fiberglass fabric or aluminized fiberglass fabric.

Clause 12. The method of any of clauses 1 to 11, wherein the mold is comprised of glass.

Clause 13. The method of any of clauses 7 to 12, wherein in (e) the polymerizable composition within the mold cavity is subjected to a cure cycle sufficient to achieve 2% to 15% allyl functional group conversion.

Clause 14. The method of any of clauses 7 to 12, wherein in (e) the polymerizable composition within the mold cavity is subjected to a cure cycle sufficient to achieve 10% to 30% allyl functional group conversion.

Clause 15. The method of any of clauses 7 to 12, wherein in (e) the polymerizable composition within the mold cavity is subjected to a cure cycle sufficient to achieve 15% to 25% allyl functional group conversion.

Clause 16. The method of any of clauses 7 to 13, wherein in (e) the polymerizable composition within the mold cavity is subjected to a cure cycle sufficient to achieve 2% to 8% allyl functional group conversion.

Clause 17. The method of any of clauses 1 to 16, wherein the sealing means comprises (i) a gasket and/or (ii) adhesive tape.

Clause 18. The method of any of clauses 1 to 17, wherein each of the front portion and the back portion of the mold has an exterior surface and an interior surface, and the interior surface of the front portion and the interior surface of the back portion each has a curvature of 0.0 to 10.0 diopters.

Clause 19. The method of any of clauses 1 to 18, wherein the molded polymeric article is an optical element selected from the group consisting of optical lenses, shields, visors, windows, mirrors, liquid crystal cell elements, display elements, and security elements.

Clause 20. The method of any of clauses 1 to 19, wherein the molded polymeric article is a lens.

Clause 21. The method of any one of clauses 1 to 20, wherein the cure oven is a convection cure oven.

Clause 22. The method of any one of clauses 1 to 21, wherein in (h) the mold is enclosed within the auxiliary curing chamber.

While specific embodiments of the present invention have been described in detail, it will be appreciated by those skilled in the art that various modifications and alternatives to those details could be developed in light of the overall teachings of the disclosure. Accordingly, the particular embodiments disclosed herein are intended to be illustrative only and not limiting as to the scope of the invention, which is to be given the full breadth of the claims appended and any and all equivalents thereof.

Therefore, we claim:

1. A method for preparing a molded polymeric article, the method comprising:
   (a) providing a polymerizable composition;
   (b) introducing the polymerizable composition into a mold cavity of a mold;
   (c) sealing the polymerizable composition within the mold cavity using a sealing means;
   (d) placing the mold of (c) into a convection cure oven;
   (e) subjecting the polymerizable composition within the mold cavity to a cure cycle sufficient to at least partially cure the polymerizable composition, thereby forming an at least partially cured polymeric article within the mold cavity;
   (f) extracting the mold from the convection cure oven;
   (g) optionally, removing the sealing means from the mold;
   (h) placing the mold of (g) into an auxiliary curing chamber which is then placed into the convection cure oven, or placing the mold of (g) into an auxiliary curing chamber which is disposed within the convection cure oven, wherein the auxiliary curing chamber comprises a heat conductive material selected from the group consisting of metal sheet, metal foil, silicone-coated fiberglass fabric, aluminized fiberglass fabric, and combinations thereof;
   (i) subjecting the at least partially cured polymerizable composition within the mold cavity to a further cure cycle sufficient to complete polymerization of the polymerizable composition, thereby forming a cured polymeric article within the mold cavity; and
   (j) removing the cured polymeric article from the mold.

2. The method of claim 1, wherein in (g) the sealing means is removed from the mold.

3. The method of claim 1, wherein, prior to (d), the mold of (c) is placed within an auxiliary curing chamber which is then placed within the convection cure oven.

4. The method of claim 1, further comprising extracting the mold of (i) from the auxiliary curing chamber prior to (j).

5. The method of claim 1, wherein the polymerizable composition comprises at least one free-radically polymerizable monomer.

6. The method of claim 1, wherein the polymerizable composition comprises at least one polymerization initiator having a half-life of 10 hours at a temperature of 70° C. or higher.

7. The method of claim 5, wherein the polymerizable composition comprises at least one polyol(allyl carbonate) monomer and/or at least one isohexide bis(allyl carbonate) monomer.

8. The method of claim 7, wherein the polymerizable composition comprises the at least one polyol(allyl carbonate) monomer, which in turn comprises diethylene glycol bis(allyl carbonate) monomer.

9. The method of claim 6, wherein the polymerization initiator is selected from the group consisting of tert-amylperoxy 2-ethylhexyl carbonate, tert-butylperoxy isopropyl carbonate, tert-butylperoxy 2-ethylhexyl carbonate, polyether poly-tert-butylperoxycarbonate, tert-butyl peroxy-2-ethylhexanoate, tert-butyl peroxyisobutyrate, tert-amyl peroxyacetate, tert-amyl peroxybenzoate, tert-butyl peroxyacetate, butyl 4,4-di(tert-butylperoxy)valerate, tert-butyl peroxybenzoate, tert-butyl peroxy-3,5,5-trimethylhexanoate, benzoyl peroxide, 1,1-di(tert-butylperoxy)-3,3,5-trimethylcyclohexane, 1,1-di(tert-amylperoxy)cyclohexane, 1,1-di(tert-butylperoxy)cyclohexane, 2,2-di(tert-butylperoxy) butane, dicumyl peroxide, 1-t-amylperoxy-1-methoxycyclohexane, di-tert-butyl peroxide, 1,1-dimethyl propyl 1-methoxycyclohexylperoxide, and mixtures thereof.

10. The method of claim 1, wherein the mold is comprised of glass.

11. The method of claim 7, wherein in (e) the polymerizable composition within the mold cavity is subjected to a cure cycle sufficient to achieve 2% to 15% allyl functional group conversion.

12. The method of claim 11, wherein in (e) the polymerizable composition within the mold cavity is subjected to a cure cycle sufficient to achieve 2% to 8% allyl functional group conversion.

13. The method of claim 1, wherein the sealing means comprises (i) a gasket and/or (ii) adhesive tape.

14. The method of claim 1, wherein the mold comprises a front portion and a back portion spaced one from the other, thereby defining the mold cavity there between, and wherein each of the front portion and the back portion of the mold has an exterior surface and an interior surface, and the interior surface of the front portion and the interior surface of the back portion each has a curvature of 0.0 to 10.0 diopters.

15. The method of claim 1, wherein the molded polymeric article is an optical element selected from the group consisting of optical lenses, shields and visors, windows, mirrors, liquid crystal cell elements, display elements, and security elements.

16. The method of claim 15, wherein the molded polymeric article is a lens.

17. The method of claim 1, wherein in (h) the mold is enclosed within the auxiliary curing chamber.

* * * * *